US012204270B2

(12) United States Patent
Funatani et al.

(10) Patent No.: US 12,204,270 B2
(45) **Date of Patent: *Jan. 21, 2025**

(54) IMAGE FORMING APPARATUS WITH BRUSH THAT COLLECTS MATERIAL ADHERED TO SURFACE OF IMAGE BEARING MEMBER AND THAT INCLUDES BRUSH PORTION INCLUDING THREADS HAVING SPECIFIED THREAD DENSITY

(71) Applicant: CANON KABUSHIKI KAISHA, Tokyo (JP)

(72) Inventors: Kazuhiro Funatani, Kanagawa (JP); Shinsuke Kobayashi, Kanagawa (JP); Shuichi Tetsuno, Kanagawa (JP); Toshihiko Takayama, Kanagawa (JP); Jun Hara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,407

(22) Filed: Nov. 2, 2023

(65) Prior Publication Data

US 2024/0069482 A1 Feb. 29, 2024

Related U.S. Application Data

(63) Continuation of application No. 17/986,078, filed on Nov. 14, 2022, now Pat. No. 11,841,669, which is a (Continued)

(30) Foreign Application Priority Data

Dec. 17, 2020 (JP) ................................. 2020-209232

(51) Int. Cl.

*G03G 21/00* (2006.01)
*G03G 15/02* (2006.01)
(Continued)

(52) U.S. Cl.

CPC ..... *G03G 21/0064* (2013.01); *G03G 15/0216* (2013.01); *G03G 21/0035* (2013.01);
(Continued)

(58) Field of Classification Search

CPC ............. G03G 15/0216; G03G 21/035; G03G 21/0064; G03G 21/06; G03G 21/08;
(Continued)

(56) References Cited

U.S. PATENT DOCUMENTS

| | | | |
|---|---|---|---|
| 5,077,172 | A | 12/1991 | Kubert |
| 5,530,524 | A | 6/1996 | Tsujita |

(Continued)

FOREIGN PATENT DOCUMENTS

| | | | |
|---|---|---|---|
| CN | 1637647 | A | 7/2005 |
| CN | 1959564 | A | 5/2007 |

(Continued)

OTHER PUBLICATIONS

U.S. Appl. No. 17/515,636, filed Nov. 1, 2021 (First Named Inventor: Shinsuke Kobayashi).

(Continued)

*Primary Examiner* — Joseph S Wong
(74) *Attorney, Agent, or Firm* — Venable LLP

(57) ABSTRACT

An image forming apparatus includes a charging unit that charges an image bearing member, a developing unit that forms a toner image on an latent image formed on the image bearing member, a transfer unit that transfers the toner image onto a transfer material, a charge neutralizer that neutralizes a charge of the image bearing member downstream of a transfer portion and upstream of a charging portion in a rotating direction of the image bearing member, a conductive collecting unit that collects a material adhering on the image bearing member downstream of the transfer portion and upstream of the charging portion, wherein the develop- (Continued)

ing unit collects residual toner on the image bearing member, an voltage application unit sets a potential difference between the voltage applied to the collecting unit and the surface electric potential of the image bearing member not more than a discharge threshold.

8 Claims, 7 Drawing Sheets

Related U.S. Application Data continuation of application No. 17/531,924, filed on Nov. 22, 2021, now Pat. No. 11,526,116.

(51) Int. Cl.
*G03G 21/06* (2006.01)
*G03G 21/08* (2006.01)

(52) U.S. Cl.
CPC ............ *G03G 21/06* (2013.01); *G03G 21/08* (2013.01); *G03G 2215/017* (2013.01); *G03G 2215/022* (2013.01); *G03G 2221/0005* (2013.01)

(58) Field of Classification Search
CPC ....... G03G 2215/017; G03G 2215/022; G03G 2221/0005
See application file for complete search history.

(56) References Cited

U.S. PATENT DOCUMENTS

| | | | | |
|---|---|---|---|---|
| 6,871,030 | B2 | 3/2005 | Nishimura | |
| 7,146,123 | B2 | 12/2006 | Kidaka | |
| 7,620,339 | B2 | 11/2009 | Kubo | |
| 7,657,197 | B2 | 2/2010 | Yoshikawa | |
| 7,805,089 | B2 | 9/2010 | Yoshikawa | |
| 9,086,671 | B2 | 7/2015 | Ichinose et al. | |
| 9,341,988 | B2 | 5/2016 | Funatani et al. | |
| 9,599,935 | B2 | 3/2017 | Asai et al. | |
| 10,073,383 | B2 | 11/2018 | Kobayashi et al. | |
| 10,386,755 | B2 | 8/2019 | Kobayashi et al. | |
| 11,099,496 | B2 | 8/2021 | Kobayashi et al. | |
| 11,526,116 | B2 | 12/2022 | Funatani et al. | |
| 11,841,669 | B2 * | 12/2023 | Funatani | G03G 21/06 |
| 2004/0086297 | A1 | 5/2004 | Watanabe | |
| 2005/0169669 | A1 | 8/2005 | Nishimura et al. | |
| 2008/0152387 | A1 | 6/2008 | Kubo | |
| 2015/0093143 | A1 | 4/2015 | Funatani | |
| 2017/0329273 | A1 | 11/2017 | Imanaka et al. | |
| 2021/0382430 | A1 | 12/2021 | Funatani et al. | |

FOREIGN PATENT DOCUMENTS

| | | | |
|---|---|---|---|
| CN | 101196723 | A | 6/2008 |
| CN | 110244531 | A | 9/2019 |
| CN | 111610701 | A | 9/2020 |
| GB | 1210666 | A | 10/1970 |
| JP | H04-267282 | A | 9/1992 |
| JP | H06-222703 | A | 8/1994 |
| JP | H08-211762 | A | 8/1996 |
| JP | H09-211979 | A | 8/1997 |
| JP | H09-269710 | A | 10/1997 |
| JP | 2003-255676 | A | 9/2003 |
| JP | 2003-271030 | A | 9/2003 |
| JP | 2004-252203 | A | 9/2004 |
| JP | 2005-128170 | A | 5/2005 |
| JP | 2006-058476 | A | 3/2006 |
| JP | 2007-003610 | A | 1/2007 |
| JP | 2007-279431 | A | 10/2007 |
| JP | 2008-233219 | A | 10/2008 |
| JP | 2010-026059 | A | 2/2010 |

OTHER PUBLICATIONS

Office Action dated Jul. 9, 2024, in Japanese Patent Application No. 2020-209232.
Get to know it first, then master it; The imaging principle of electrostatic imaging digital printing machines, Sep. 2012.
Office Action dated May 10, 2024, in Chinese Patent Application No. 202111525315.4.
Office Action dated Nov. 12, 2024, in Japanese Patent Application No. 2020-209232.

* cited by examiner

IMAGE FORMING APPARATUS WITH BRUSH THAT COLLECTS MATERIAL ADHERED TO SURFACE OF IMAGE BEARING MEMBER AND THAT INCLUDES BRUSH PORTION INCLUDING THREADS HAVING SPECIFIED THREAD DENSITY

This is a continuation of U.S. patent application Ser. No. 17/986,078, filed Nov. 14, 2022, which is a continuation of U.S. patent application Ser. No. 17/531,924, filed Nov. 22, 2021 and issuing as U.S. Pat. No. 11,526,116.

BACKGROUND OF THE INVENTION

Field of the Invention

The present invention relates to an image forming apparatus.

Description of the Related Art

Image forming apparatuses such as laser printers, photocopiers, and facsimiles obtain a recorded image by transferring a toner image formed on an image bearing member onto a transfer material, using electrophotography and the like.

A cleaner-less system, which collects residual toner in a developing unit and reuses it, has been proposed in recent years as one form of such image forming apparatus. In this cleaner-less system, toner, paper dust, and filler that has adhered to the photosensitive drum in the transfer portion may sometimes affect downstream processes.

Japanese Patent Application Publication No. 2007-279431 discloses a configuration provided with a collecting member that makes contact with a surface of the photosensitive drum to collect residual toner or adhering material on the photosensitive drum.

SUMMARY OF THE INVENTION

The configuration of Japanese Patent Application Publication No. 2007-279431 has the following issues. With a collecting member provided downstream of the transfer portion in the rotating direction of the photosensitive drum, toner that failed to be transferred onto paper and remained on the photosensitive drum may accumulate on the collecting member and deteriorate its paper dust collection performance, and paper dust, collected in the developing unit, would eventually lead to image defects.

The paper dust adhering on the photosensitive drum varies in size depending on the type of the paper, etc., and can be as large as several millimeters. In locations where such large-size paper dust has adhered to, the charge cannot be neutralized by exposure, and this sometimes led to an image defect due to a reduced amount of discharge in the subsequent charging process.

The present invention was made in view of the issues described above, its object being to provide a technique to reduce the occurrence of image defects in a cleaner-less type image forming apparatus caused by adhering material such as paper dust or residual toner adhering on the photosensitive drum.

The present invention provides an image forming apparatus comprising:

a rotatable image bearing member;

a charging unit that contacts the image bearing member to form a charging portion, and charges a surface of the image bearing member in the charging portion;

an exposure unit that exposes the surface of the image bearing member charged in the charging portion to form an electrostatic latent image;

a developing unit that supplies toner charged to have a predetermined polarity to the electrostatic latent image formed on the surface of the image bearing member to form a toner image;

a transfer unit that contacts the image bearing member to form a transfer portion, and transfers the toner image formed on the surface of the image bearing member onto a transfer material in the transfer portion;

a charge neutralizer that neutralizes a charge on the surface of the image bearing member downstream of the transfer portion and upstream of the charging portion in a rotating direction of the image bearing member;

a collecting unit that has conductivity and collects an adhering material adhered to the surface of the image bearing member downstream of the transfer portion and upstream of the charging portion in the rotating direction of the image bearing member;

a voltage application unit that applies a voltage of the predetermined polarity to the collecting unit; and a controller that controls the voltage application unit, wherein the developing unit collects residual toner on the surface of the image bearing member after the toner image has been transferred onto the transfer material in the transfer portion, and the controller controls the voltage application unit such that a potential difference between a voltage of the predetermined polarity applied to the collecting unit and a surface electric potential of the image bearing member on the surface of the image bearing member is not more than a discharge threshold.

The present invention also provides an image forming apparatus comprising:

a rotatable image bearing member;

a charging unit that contacts the image bearing member to form a charging portion, and charges a surface of the image bearing member in the charging portion;

an exposure unit that exposes the surface of the image bearing member charged in the charging portion to form an electrostatic latent image;

a developing unit that supplies toner charged to have a predetermined polarity to the electrostatic latent image formed on the surface of the image bearing member to form a toner image;

a transfer unit that contacts the image bearing member to form a transfer portion, and transfers the toner image formed on the surface of the image bearing member onto a transfer material in the transfer portion;

a charge neutralizer that neutralizes a charge on the surface of the image bearing member downstream of the transfer portion and upstream of the charging portion in a rotating direction of the image bearing member;

a collecting unit that has conductivity and collects an adhering material adhered to the surface of the image bearing member downstream of the transfer portion and upstream of the charging portion in the rotating direction of the image bearing member;

a voltage application unit that applies a voltage of the predetermined polarity to the collecting unit; and a controller that controls the voltage application unit, wherein the developing unit collects residual toner on the surface of the image bearing member after the toner image has been transferred onto the transfer material in the transfer portion, and the collecting unit is provided downstream of the charge neutralizer and upstream of the charging portion in the rotating direction of the image bearing member.

The present invention can provide a technique to reduce the occurrence of image defects in a cleaner-less type image forming apparatus caused by adhering material such as paper dust or residual toner adhering on the photosensitive drum.

Further features of the present invention will become apparent from the following description of exemplary embodiments with reference to the attached drawings.

DESCRIPTION OF THE EMBODIMENTS

Embodiments of the present invention will be hereinafter described in detail with reference to the drawings. It should be noted that the sizes, materials, shapes, and relative arrangement or the like of constituent components described in the embodiments should be altered suitably in accordance with the configuration and various conditions of an apparatus to which the invention is applied, and it is not intended to limit the scope of this invention to the following embodiments. Not all the combinations of features described in the embodiments are necessarily essential for the means of solution of the present invention.

Embodiment 1

Overall Configuration of Image Forming Apparatus

Figure 1:
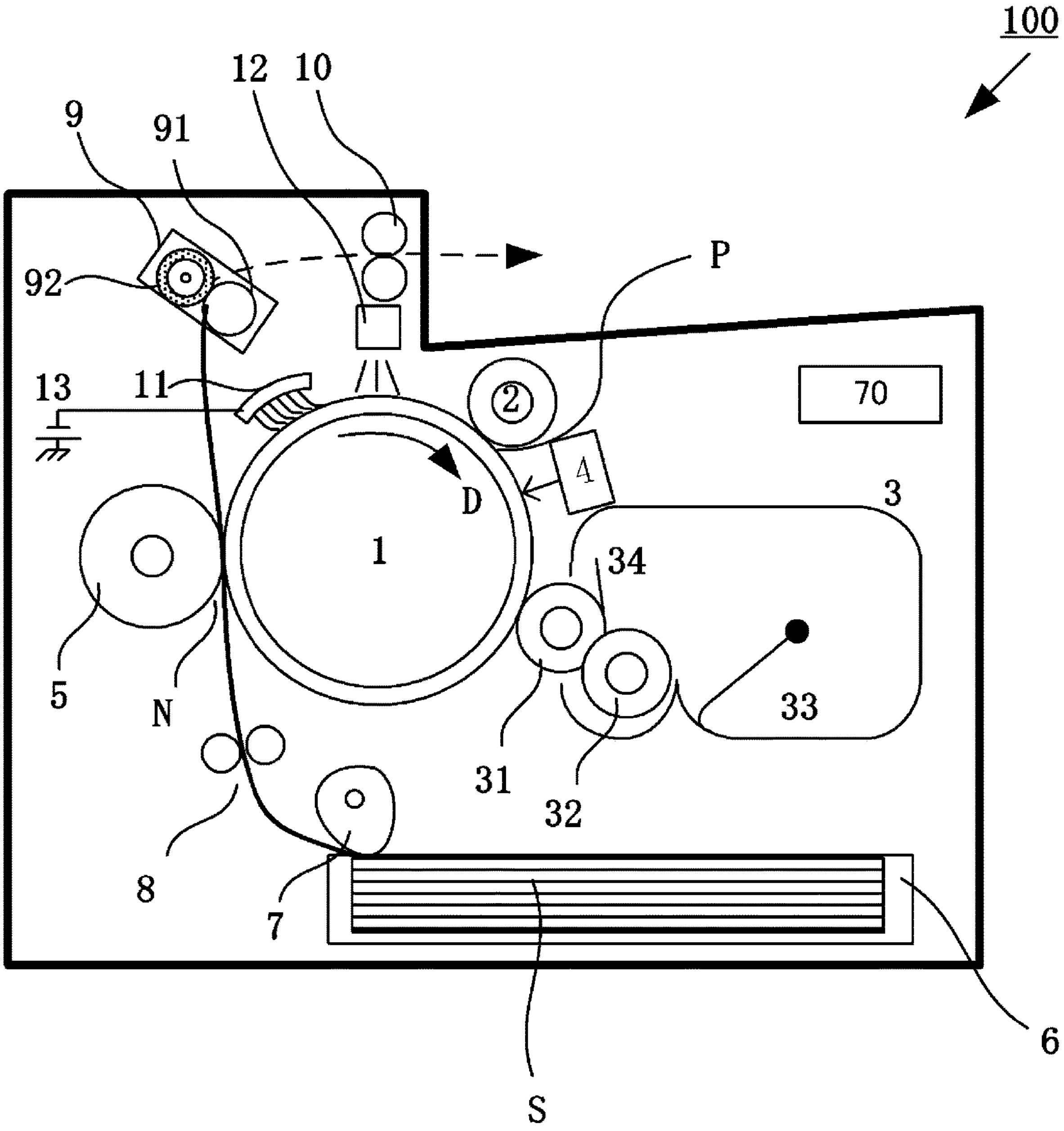
FIG. 1 is a diagrammatic view of an image forming apparatus in Embodiment 1.

FIG. 1 illustrates a schematic configuration of one embodiment of the image forming apparatus according to the present invention. The image forming apparatus of this embodiment is a monochrome printer.

The image forming apparatus 100 in this embodiment is provided with a cylindrical photosensitive member, i.e., a photosensitive drum 1, as an image bearing member. Around the photosensitive drum 1 are provided a charging roller 2 as a charging unit, and a developing apparatus 3 as a developing unit. Between the charging roller 2 and the developing apparatus 3 in the drawing is provided an exposure apparatus 4 as an exposure unit. A transfer roller 5 is in pressure contact with the photosensitive drum 1.

The photosensitive drum 1 in this embodiment is a negatively chargeable organic photosensitive member. This photosensitive drum 1 has a photosensitive layer on an aluminum drum-like substrate. The photosensitive drum 1 is rotatable around its axis, and driven to rotate at a predetermined processing speed by a drive device (not shown) in the direction of arrow D in the drawing (clockwise on the paper plane). In this embodiment, the processing speed corresponds to the circumferential velocity (surface movement speed) of the photosensitive drum 1.

The charging roller 2 contacts the photosensitive drum 1 with a predetermined pressure and forms a charging portion P. A charging voltage of a desired level is applied by a high voltage charging power supply (not shown) as a charging voltage supply unit, so that the surface of the photosensitive drum 1 is charged uniformly to a predetermined electric potential. In this embodiment, the photosensitive drum 1 is charged to a negative polarity by the charging roller 2, to an electric potential of about −500 V.

The exposure apparatus 4 is a laser scanner apparatus in this embodiment, which outputs a laser beam corresponding to image information input from an external apparatus such as a host computer to scan and expose the surface of the photosensitive drum 1. An electrostatic latent image (electrostatic image) corresponding to the image information is formed on the surface of the photosensitive drum 1 by this exposure. The electric potential of the exposed part in this embodiment is about −100 V. The exposure apparatus 4 is not limited to a laser scanner apparatus. For example, an LED array having a plurality of LEDs aligned along a longitudinal direction (axial direction of the cylinder) of the photosensitive drum 1 may be adopted.

This embodiment employs a contact development system as the developing method. The developing apparatus 3 includes a developing roller 31 as a developer carrying member, a toner supply roller 32 as a developer supply unit, a developer container 33 containing toner, and a developing blade 34. Toner (developer) supplied from the developer container 33 to the developing roller 31 by the toner supply roller 32 is charged to a predetermined polarity as it passes through a part where it contacts the developing blade 34. This embodiment uses toner having a particle size of 6 μm, its standard polarity when charged being negative. While this embodiment employs a mono-component, non-magnetic, contact development method, a two-component, non-magnetic, contact/non-contact development method may also be used.

The electrostatic latent image formed on the photosensitive drum 1 is developed as a toner image at a location where the developing roller 31 and the photosensitive drum 1 face each other, with the toner conveyed thereto by the developing roller 31. At this time, a development voltage is applied to the developing roller 31 by a high voltage development power supply (not shown) as a development voltage application unit. In this embodiment, the electrostatic latent image is developed by reversal development. Namely, the electrostatic latent image is developed as a toner image, with the toner charged to the same polarity as that of the charged photosensitive drum 1 adhering to portions of the charged photosensitive drum 1 where the charges have decayed by exposure.

For the transfer roller 5, anything that is made of an elastic material such as sponge rubber composed of polyurethane rubber, EPDM (ethylene propylene diene monomer rubber), NBR (nitrile butadiene rubber) may be suitably used. The transfer roller 5 is pressed against the photosensitive drum 1 and forms a transfer portion N where the photosensitive drum 1 and the transfer roller 5 make pressure contact. A predetermined voltage is applied to the transfer roller 5 at a predetermined timing from a high voltage transfer power supply (not shown) as a transfer voltage application unit connected to the transfer roller.

A transfer material S (e.g., recording material such as paper) stored in a cassette 6 is fed out by a paper feeding unit 7 to match the timing of arrival of the toner image formed on the photosensitive drum 1 at the transfer portion N, and conveyed through a pair of resist rollers 8 to the transfer portion N. The toner image formed on the photosensitive drum 1 is transferred onto the transfer material S by the transfer roller 5, to which a predetermined voltage is applied by the high voltage transfer power supply.

The transfer material S after the toner image has been transferred thereon is conveyed to a fixing unit 9. The fixing unit 9 of this embodiment is a film heating type fixing unit including a fixing film 91 containing a fixing heater and a thermistor (not shown) for measuring the temperature of the heater, and a pressure roller 92 for making pressure contact with the fixing film 91. The toner image is fixed in the fixing unit 9 where heat and pressure are applied to the transfer material S. After the fixing, the transfer material S is discharged out of the machine through a pair of discharge rollers 10.

Between the transfer portion N and the charging portion P is provided a pre-exposure apparatus 12 as a charge neutralizer that neutralizes the charge on the surface of the photosensitive drum 1. This is for minimizing the electric potential variation on the photosensitive drum caused by the transfer, to stabilize the discharge at the charging portion P and to achieve a uniform electrical potential.

Untransferred toner, which was not transferred onto the transfer material S and left on the photosensitive drum 1, is removed in the following process. Untransferred toner is a mixture of positively charged toner and negatively insufficiently charged toner. The untransferred toner is negatively charged again by the discharge at the charging portion P. The untransferred toner that is negatively charged again at the charging portion P thereafter reaches the developing apparatus 3 as the photosensitive drum 1 rotates. When the toner reaches the developing apparatus 3, there is formed an electrostatic latent image corresponding to the image information on the photosensitive drum 1 as mentioned in the foregoing. How the untransferred toner behaves in an exposed part and a non-exposed part of the photosensitive drum 1 after reaching the developing apparatus 3 will be explained separately.

The untransferred toner adhering to a non-exposed part of the photosensitive drum 1 moves over to the developing roller 31 in the developing apparatus 3 by the potential difference between the non-exposed part of the photosensitive drum 1 and the development voltage and is collected back to the developer container 33. The toner collected back to the developer container 33 is used again for image formation. On the other hand, the untransferred toner adhering to an exposed part of the photosensitive drum 1 does not move from the photosensitive drum 1 onto the developing roller 31 in the developing apparatus 3, but moves on to the transfer portion N with the toner supplied from the developing roller 31 for the development, and is transferred onto the transfer material S, i.e., removed from the photosensitive drum 1.

The pre-exposure apparatus 12 mentioned above neutralizes the charge on the photosensitive drum 1 after transfer to ensure an uniform discharge so that the untransferred toner can be negatively charged consistently. This eliminates toner that cannot be sufficiently negatively charged again, which makes possible more reliable collection of untransferred toner in the developing apparatus 3.

The image forming apparatus 100 may further include a controller 70. The controller 70 is composed of an information processing apparatus including a processor, or a processing circuit such as FPGA or ASIC, and performs information processing relating to operations of the image forming apparatus 100 based on a program or a user instruction. The controller 70 performs control of, for example, voltage application units or the voltages applied for charging, development, transfer, and collection, control of pre-exposure or exposure based on image information, and control of drive members for the photosensitive drum and various rollers. The controller 70 may be composed of a plurality of information processing apparatuses for performing these various types of processing configured to operate in cooperation with each other.

Paper Dust Removal Mechanism

When toner is transferred from the photosensitive drum 1 onto the transfer material S in the transfer portion N, sometimes, paper dust fiber contained in the transfer material S adheres to the photosensitive drum 1. If this paper dust fiber adhering to the photosensitive drum 1 is not treated in the cleaner-less system adopted in this embodiment, the paper dust fiber will be collected in the developing apparatus 3. The paper dust fiber may then deteriorate image qualities. For example, when paper dust collected in the developing apparatus 3 and stuck between the developing blade 34 and the developing roller 31 scrapes off the toner on the developing roller 31, the image will have streaks (hereinafter referred to as development streaks), or the paper dust collected in the developing apparatus 3 may obstruct the charging of the toner. The paper dust fiber, if not removed, may reach the part where the charge is neutralized by the pre-exposure apparatus 12. Large-size paper dust adhering to the photosensitive drum 1 will block the light from the pre-exposure apparatus 12 so that the charge on the photosensitive drum surface where the paper dust adheres to cannot be neutralized. This results in a reduced amount of discharge in locations that failed to be neutralized on the photosensitive drum surface in the subsequent charging process, and leads to a collection failure, i.e., the untransferred toner remaining in these locations will be charged insufficiently and fail to be collected in the developing apparatus 3.

Therefore, in this embodiment, a brush member 11 is provided as a paper dust collecting member for removing the paper dust adhering to the photosensitive drum 1. As illustrated in FIG. 1, the brush member 11 is disposed downstream of the transfer portion N and upstream of the charging portion P in the direction of rotation of the photosensitive drum 1 (rotating direction D) and in contact with the photosensitive drum 1. The brush member 11 is supported by a support member (not shown) and disposed at a fixed position relative to the photosensitive drum 1, and rubs on the surface of the photosensitive drum 1 as the photosensitive drum 1 rotates.

The brush member 11 catches paper dust that has moved over from the transfer material S onto the photosensitive drum 1 in the transfer portion N, to reduce the amount of paper dust that moves on further downstream of the brush member 11 in the moving direction of the photosensitive drum 1, to the charging portion P and the developing apparatus 3. Large-size paper dust, in particular, that causes a large influence, tends to be caught by the brush member 11, so that the collection failure due to insufficient neutralization of the charge mentioned above can be prevented.

On the other hand, in this configuration, the untransferred toner that has reached the brush member 11 is not caught by the brush member but stays on the photosensitive drum 1 and moves on further downstream. This is because the toner is charged and does not come off of the photosensitive drum 1 even when the brush member 11 rubs on the drum, due to the high electrostatic adhesion that acts between the toner and the photosensitive drum 1. Namely, while the brush member 11 collects paper dust, it avoids collecting toner as much as possible.

This does not apply to toner particles carrying a relatively smaller amount of charge and having a weaker electrostatic adhesion to the photosensitive drum 1, or if the brush specifications are not appropriate, in which case toner may adhere to the brush member 11. A method of preventing toner adhesion to the brush member 11 will be described later.

Any adhering materials such as paper dust captured by the brush member 11 are removed at an appropriate timing. For example, the paper dust may be removed together with the toner by changing the attitude of the brush member 11 during post-process rotation after completion of a print job as will be described later. Alternatively, the brush member 11 may be cleaned or replaced during maintenance of the apparatus.

An optimal configuration of the brush member 11 will be described below.

Brush Width

The brush member 11 in this embodiment has a length of 5 mm along the circumferential direction of the photosensitive drum 1, but the length is not limited to this. For example, the length may be changed suitably in accordance with the service life of the image forming apparatus or the process cartridge. The longer the length of the brush member 11 along the circumferential direction of the drum, the longer the period of time of paper dust collection. The brush member 11 here has a length of 216 mm along the longitudinal direction of the brush member 11 (axial direction of the drum), but the length is not limited to this. For example, the length may be changed suitably in accordance with the maximum paper feed width of the image forming apparatus.

Brush Fineness

The brush member 11 in this embodiment has a fineness of 2 denier, which may be changed suitably as long as the brush density requirements to be described later are satisfied.

Brush Density

The brush member 11 should have a density determined in consideration of toner passability and paper dust collection performance. Namely, too high a density of the brush member 11 will lower the toner passability and can cause trouble because the toner may be stuck, which may then be scattered and contaminate the machine interior. If the density of the brush member 11 is too low, the paper dust collection performance will be lowered.

Accordingly, we investigated the relationships between the density of the brush member 11 and the paper dust collection performance, and the occurrence of machine interior contamination caused by toner scattering resulting from accumulation of residual toner on the photosensitive drum 1 in the brush member 11. First, how we judged the paper dust collection performance will be described. In this embodiment, the paper dust collection performance is judged based on the number of dots that appear in the image caused by adhesion of paper dust on the photosensitive drum 1. This is because, as mentioned before, dots in the image result from the collection failure in spots of photosensitive drum 1 where paper dust has adhered.

In this embodiment, 50,000 copies are printed using Century Star paper (product name, produced by CENTURY PULP AND PAPER) as the transfer material S, and for every 100th time, an entirely white image is printed after printing an entirely black image. The paper dust collection performance is judged based on the maximum value of the number of dots that appeared in the entirely white images. In this embodiment, when the number of dots of 0.3 mm or more, which has a large visual impact, is larger than 10, the paper dust collection performance is judged as No Good (NG).

To determine the occurrence of machine interior contamination, 5,000 print jobs, each printing 10 copies of an image with a coverage rate of 5%, were performed, i.e., 50,000 copies were printed, using Century Star paper as the transfer material S. After that, it was determined whether there was contamination inside the machine based on whether or not any toner contamination had occurred around the brush member 11. These tests can confirm that no trouble occurs over a long period of time. The number of printed copies per one job was set to 10 in the investigation conducted by the inventors of the present application because in most cases the number of copies a user prints in one job is 10 or less.

Table 1 shows the relationships between the density of the brush member 11 and the paper dust collection performance, and the occurrence of machine interior contamination, investigated as described above. The unit of density of the brush member 11 "kF/inch$^2$" indicates the number of filaments per square inch.

TABLE 1

| Density of brush member 11 [kF/inch$^2$] | Paper dust collection performance: Number of dots (≥0.3 mm) | Judgement | Machine interior contamination |
|---|---|---|---|
| 50 | 28 | NG | Not contaminated |
| 80 | 19 | NG | Not contaminated |
| 110 | 10 | OK | Not contaminated |
| 140 | 7 | OK | Not contaminated |
| 170 | 3 | OK | Not contaminated |
| 200 | 2 | OK | Not contaminated |
| 240 | 0 | OK | Not contaminated |
| 270 | 1 | OK | Not contaminated |
| 300 | 1 | OK | Not contaminated |
| 330 | 0 | OK | Contaminated |
| 370 | 1 | OK | Contaminated |
| 400 | 0 | OK | Contaminated |

The above results show that the requirements for paper dust collection performance and prevention of machine interior contamination can both be met if the brush member 11 has a density of 110 to 300 kF/inch$^2$. In this embodiment, based on the above results, the brush member 11 has a density of 170 kF/inch$^2$ so that paper dust collection performance and prevention of machine interior contamination can both be achieved.

Brush Inroad Amount

Figure 2A:
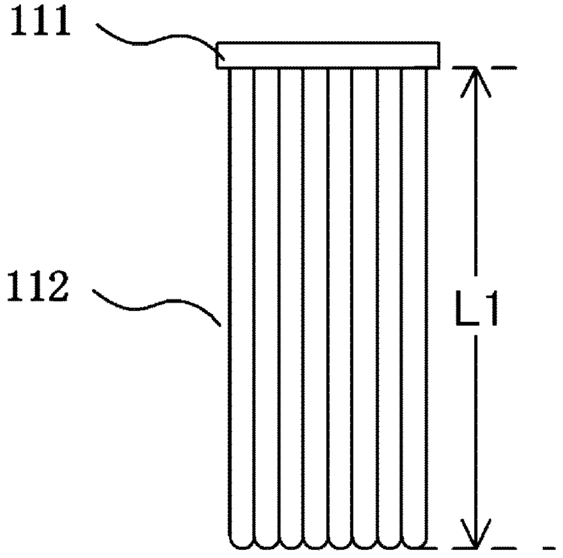
FIGS. 2A and 2B are diagrammatic views of a brush member.
Figure 2B:
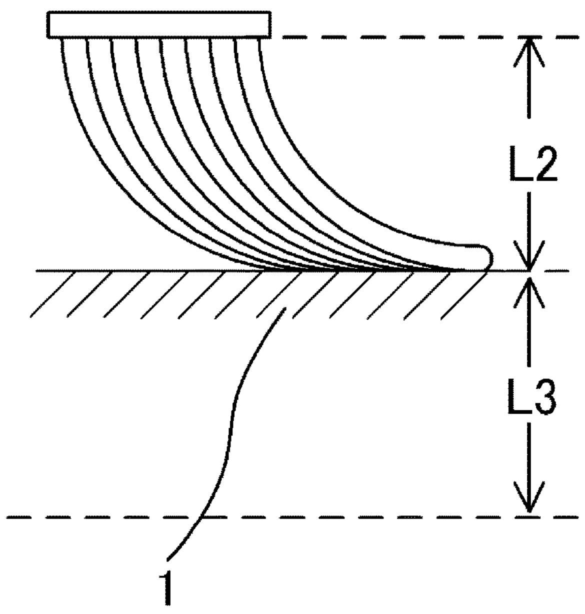

Next, the amount of inroad of the brush member 11 onto the photosensitive drum 1 (herein referred to as "inroad amount of brush member 11") will be described with reference to FIGS. 2A and 2B. FIG. 2A is a diagrammatic view illustrating the brush member 11 alone and not in contact with the photosensitive drum 1 or the like. FIG. 2B is a diagrammatic view of a state of the brush member 11 brought into contact with the photosensitive drum 1 (brush member 11 incorporated into the image forming apparatus). The brush member 11 includes a base fabric 111 and thread 112. Here, the term "inroad" does not necessarily refer only to the brush member 11 encroaching onto the photosensitive drum 1. The term "inroad" here shall also refer to a state where the brush member 11 making contact with the photosensitive drum 1 is deformed and appears as if the brush member 11 were encroaching onto the photosensitive drum 1 when observed from outside.

As shown in FIG. 2A, L1 denotes the distance from the base fabric 111 to the tip of the thread 112 of the brush member 11 on its own, i.e., in a state where no force is being applied that tries to bend the thread 112. L1 in this embodiment is 6.5 mm.

The brush member 11 has its base fabric 111 fixed on a support member (not shown) by a fastener such as a double sided tape, and is disposed such that the tip of the thread 112 encroaches onto the photosensitive drum 1. The clearance between the support member and the photosensitive drum 1 is fixed here. L2 denotes the distance between the base fabric 111 and the photosensitive drum 1. The amount of inroad of the brush member 11 is defined in this embodiment as the difference L3 between L1 and L2.

Next, how the amount of inroad of the brush member 11 is determined will be described. Through investigation, the inventors of the present application found out that the amount of inroad of the brush member 11 had a large impact on the paper dust collection performance of the brush member 11. Note, the paper dust collection performance here refers to the performance whereby large paper dust, of a particle size of 0.8 mm or more, for example, is collected.

A small inroad amount of the brush member 11 means a shorter contact length between the brush member 11 and the photosensitive drum 1. Therefore, the inertial force of the large-size paper dust traveling on the photosensitive drum 1 will shift the brush tip of the brush member 11 and the paper dust will readily pass through. Any large-size paper dust that has passed through may lead to occurrence of development streaks mentioned above.

In contrast, a large inroad amount of the brush member 11 means a larger contact length between the brush member 11 and the photosensitive drum 1, with the brush tip lying flat and the middle part of the brush member 11 abutting on the photosensitive drum 1 (FIG. 2B). With a larger contact length between the brush member 11 and the photosensitive drum 1, the brush tip of the brush member 11 hardly shifts when the paper dust comes into contact therewith, so that the paper dust collection performance is improved, as large-size paper dust is less likely to pass through. Consequently, the occurrence of development streaks can be prevented. To ensure the performance whereby large-size paper dust is collected, it is preferable to make the inroad amount of the brush member 11 sufficiently large.

On the other hand, it was also found out that the amount of inroad of the brush member 11 had a large bearing on the image apart from the development streaks. Namely, the larger the inroad amount, the higher the contact pressure the brush member 11 applies to the photosensitive drum 1 when rubbing thereon, which creates an unintentional unevenness in the charge on the photosensitive drum 1 and results in image density non-uniformity (hereinafter referred to as friction memory).

Figure 3:
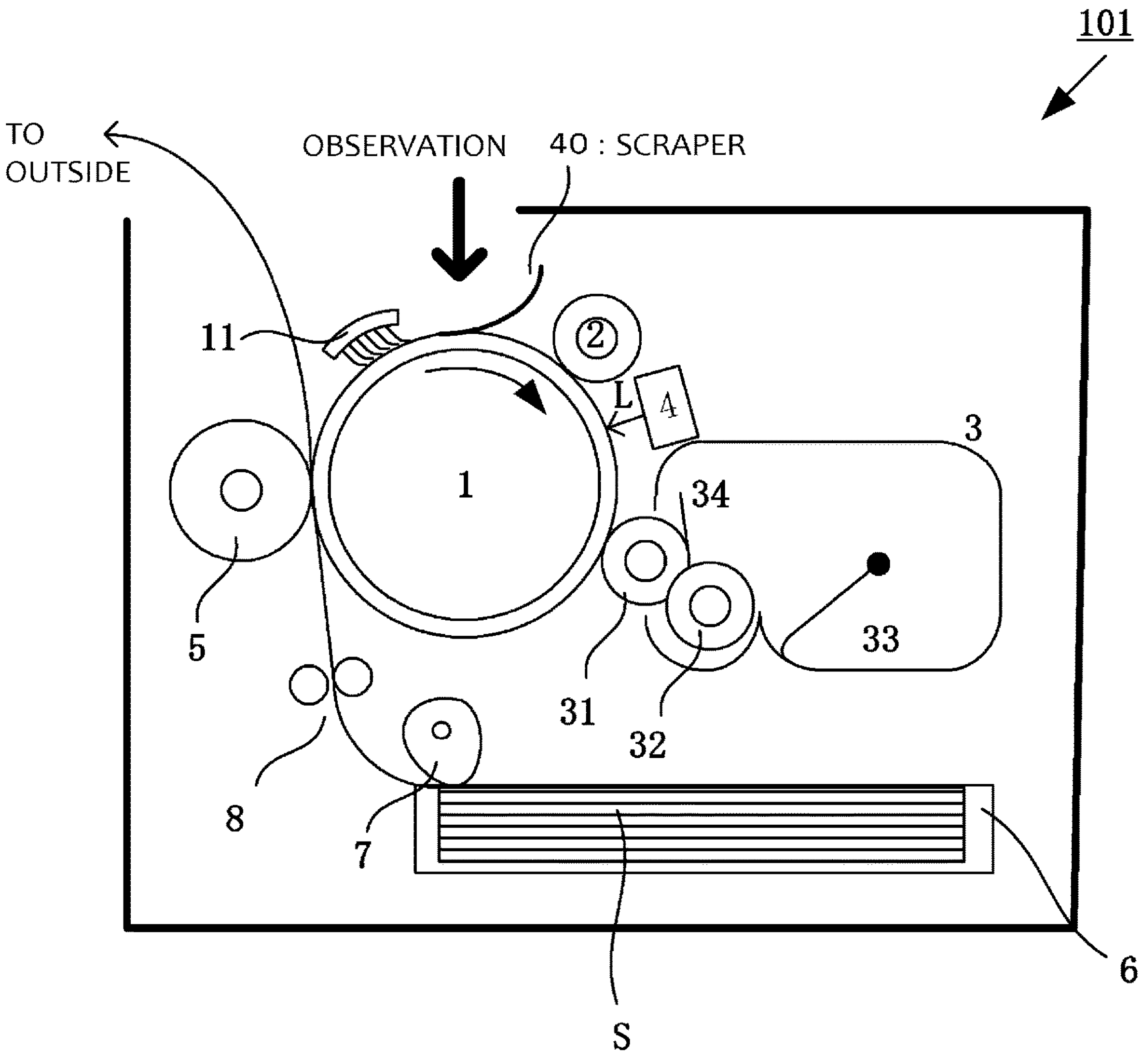
FIG. 3 is a diagrammatic view of an apparatus for testing paper dust collection performance.

Accordingly, we investigated the relationships between the inroad amount of the brush member 11 and the large-size paper dust collection performance, and the occurrence of friction memory. First, how we judged the large-size paper dust collection performance will be described with reference to FIG. 3. In this embodiment, a test apparatus 101 was prepared, in which a scraper 40 was attached downstream of the brush member 11 on the photosensitive drum 1, to observe the paper dust collected by the scraper 40 and make a judgement based on the number of large-size paper dust particles contained therein. In this embodiment, the paper dust collected by the scraper 40 after 10 copies of a white image have been printed, using Century Star paper as the transfer material S, was observed. When 10 or more paper dust particles of 0.8 mm or more are collected, it is judged as No Good (NG). To check if there has been a friction memory, a print test was conducted in which 50,000 copies of a halftone image were printed in a low-temperature, low-humidity environment (e.g., 15° C. and 10% RH), and the image on every 100th copy was checked for presence or absence of a friction memory.

Table 2 shows the relationships between the inroad amount of the brush member 11 and the large-size paper dust collection performance, and the occurrence of friction memory, investigated as described above.

TABLE 2

| Inroad amount of brush member 11 | Paper dust collection performance (0.8 mm or more) | | Friction |
|---|---|---|---|
| [mm] | Number | Judgement | memory |
| 0.1 | 28 | NG | Not Present |
| 0.3 | 19 | NG | Not Present |
| 0.5 | 9 | OK | Not Present |
| 0.7 | 7 | OK | Not Present |
| 0.9 | 3 | OK | Not Present |
| 1.1 | 2 | OK | Not Present |
| 1.3 | 0 | OK | Not Present |
| 1.5 | 1 | OK | Not Present |
| 1.7 | 1 | OK | Not Present |
| 2 | 0 | OK | Not Present |
| 2.2 | 1 | OK | Present |
| 2.4 | 0 | OK | Present |

The above results show that the requirements for paper dust collection performance and prevention of friction memory can both be met if the inroad amount of the brush member 11 is 0.5 to 2.0 mm. Based on the above results, the inroad amount of the brush member 11 in this embodiment is set to 1.0 mm, with which large-size paper dust collection performance and friction memory prevention can both be achieved.

Characteristic Features of this Embodiment

As described above, with the use of the brush member 11, toner deposition could be prevented, as well as the influence of paper dust was suppressed. However, a further investigation conducted by the inventors of the present application revealed that, as the untransferred toner passed through the brush member 11, the toner adhered to the brush member 11, though only slightly.

After a print job, normally, the post-process rotation after the supply of untransferred toner has stopped removes the toner that has adhered to the brush member 11. For example, changing the attitude of the brush member 11 by repeatedly driving and stopping the photosensitive drum in the post-process rotation after a print job can remove any adhering toner. However, in the case of continuous printing of a large number of copies, or in the latter half of the service life of the image forming apparatus or cartridge that contains the photosensitive drum 1 and brush member 11, toner that has adhered to the brush member 11 and failed to be removed may have accumulated after many years of use, because of which toner scattering in the machine interior mentioned above may occur.

In view of the above issue, this embodiment adopts a configuration in which a conductive member is used as the brush member 11 to apply a bias voltage, for reducing toner adhesion during continuous printing. Namely, the brush member 11 in this embodiment uses thread 112 of a conductive nylon material weaved into the base fabric 111 that has conductivity. Other materials such as conductive polyester or acrylic spun yarn may also be used for the thread 112. A power supply 13 as a voltage application unit is connected to the brush member 11 so that a voltage can be applied thereto.

A voltage of the same polarity as that of the standard polarity of the toner when charged is applied from the power supply 13 to the brush member 11. This suppresses toner adhesion to the brush member 11. Application of a voltage of the opposite polarity from that of the toner is not desirable because it will promote toner deposition.

When the absolute value of the voltage applied to the brush member 11 is large, i.e., when the potential difference between the surface of the photosensitive drum 1 and the voltage applied to the brush member 11 is large, a discharge occurs between the brush member and the exposed part. This means that the untransferred toner will be charged twice, by the brush member 11 and by the charging roller 2. The excessive amount of charge of the untransferred toner in this case will then increase the electrostatic adhesion to the photosensitive drum 1. This may sometimes cause insufficient toner collection in the developing apparatus 3 and result in a collection failure. On the other hand, when the absolute value of the voltage applied to the brush member 11 is small, i.e., when the potential difference between the surface of the photosensitive drum 1 and the voltage applied to the brush member 11 is small, the effect of suppressing toner adhesion may be compromised and the machine interior may be contaminated.

Accordingly, we investigated the relationships between the voltage applied to the brush member 11 and the collection failure and machine interior contamination. A white image is formed after one turn of the photosensitive drum 1 following formation of a black image by exposure of a predetermined range, and it is determined whether a collection failure has occurred based on whether or not untransferred toner from the black image part has adhered to the white image part. To determine the occurrence of machine interior contamination, 50 print jobs, each printing 1,000 copies of an image with a coverage rate of 5%, were performed, i.e., 50,000 copies were printed, using Century Star paper as the transfer material S, and it was determined whether or not toner contamination occurred around the brush member 11.

Table 3 shows the relationships between the voltage applied to the brush member 11 and the collection failure and machine interior contamination.

TABLE 3

| Applied voltage [V] | Collection failure | Machine interior contamination |
|---|---|---|
| −100 | OK | NG |
| −200 | OK | OK |
| −300 | OK | OK |
| −400 | OK | OK |
| −500 | OK | OK |
| −600 | OK | OK |
| −700 | NG | OK |
| −800 | NG | OK |

As shown in Table 3, when the absolute value of the voltage applied to the brush member 11 is 200 V or more, no machine contamination occurred, even though some toner adhered to the brush member 11 during the execution of the print jobs. As mentioned above, the post-process rotation after the supply of untransferred toner has stopped removes the toner that has adhered to the brush member 11.

Table 3 also indicates that, when the absolute value of the voltage applied to the brush member 11 is smaller than 600 V, excessive charging of the untransferred toner did not occur and collection failure was prevented. This is assumed to be because the untransferred toner is not charged by the brush member 11 if the potential difference between the voltage applied to the brush member 11 and the exposed part of the photosensitive drum 1 of −100 V is not more than the general discharge threshold, i.e., 500 V or less.

Based on the above results, a voltage that can both achieve prevention of collection failure and prevention of machine interior contamination, specifically, −400 V, is applied to the brush member 11.

As described above, by adopting the configuration of this embodiment, it is possible to suppress toner scattering inside the machine caused by toner deposition on the brush member 11, reduce the occurrence of dotted images caused by paper dust adhering to the photosensitive drum, and reduce the occurrence of collection failures. The present invention is applicable also to an image forming apparatus having a plurality of photosensitive drums corresponding to a plurality of colored toners. Moreover, the present invention is applicable also to an image forming apparatus of the type that directly transfers an image from the photosensitive drum 1 onto a transfer material S conveyed by a belt toward the transfer portion, or an image forming apparatus that uses an intermediate transfer member such as an intermediate transfer belt or the like.

Embodiment 2

Figure 4:
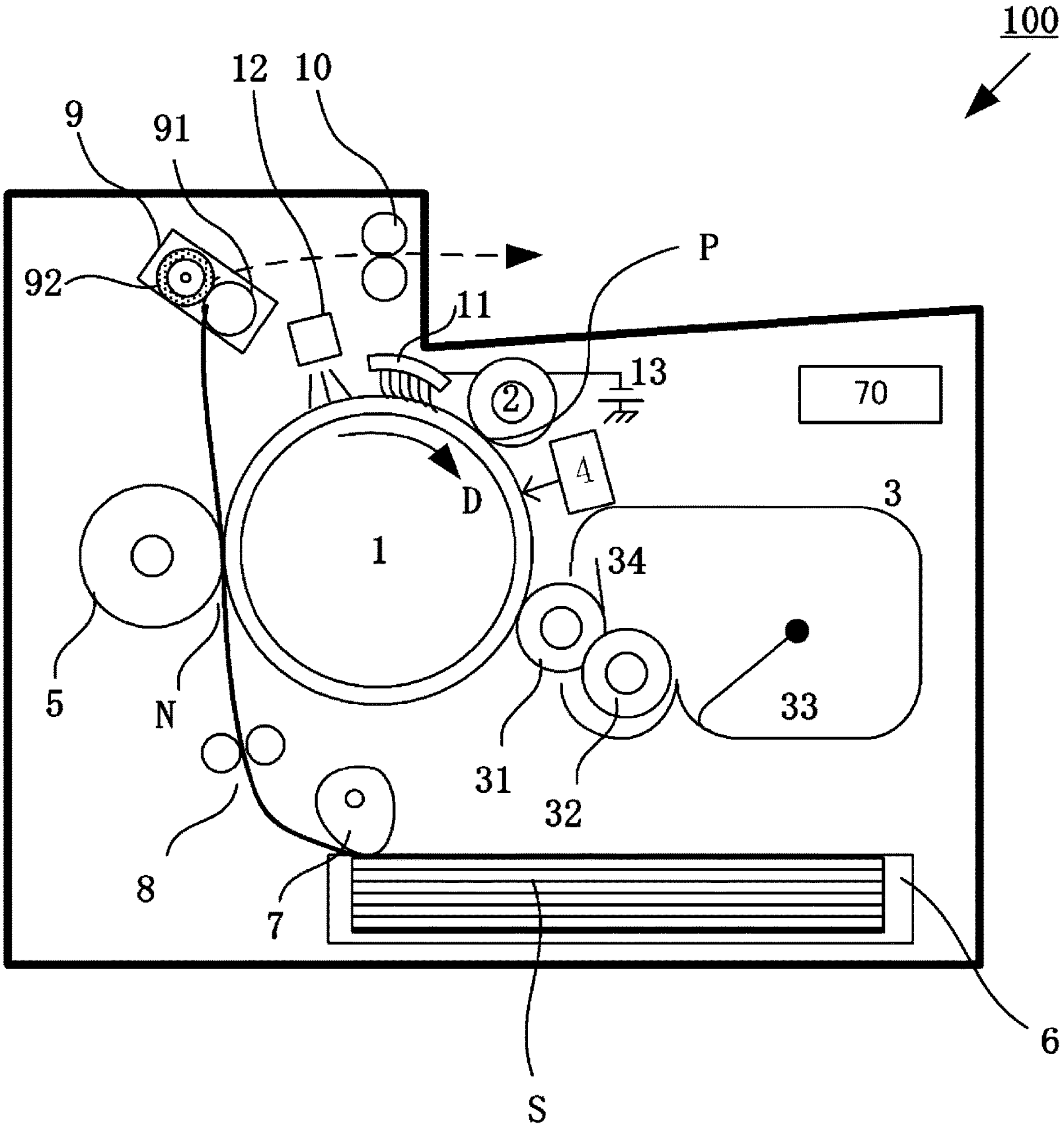
FIG. 4 is a diagrammatic view of an image forming apparatus in Embodiment 2.

This embodiment will be described below mainly with regard to the difference from Embodiment 1. FIG. 4 illustrates the configuration of the image forming apparatus 100 in this embodiment. Unlike Embodiment 1, the brush member 11 is disposed downstream of the pre-exposure apparatus 12 and upstream of the charging roller 2 in this embodiment. The electrical potential of the photosensitive drum 1 charged by the charging roller 2 in this embodiment is about −700 V, which is higher than that of Embodiment 1. The electrical potential of the exposed part is about −100 V, the same level as Embodiment 1. The bias voltage applied to the brush member 11 is −400 V, the same level as Embodiment 1. Other configurations and operations are similar to Embodiment 1 and will not be described again.

The difference between the charge potential and the electric potential of exposed parts (referred to as "latent image contrast") can be set as desired for each type of image forming apparatus. For example, the latent image contrast is set high when toner with a high charge amount is used. An issue when setting a high latent image contrast will now be described with reference to FIGS. 5A and 5B.

Figure 5A:
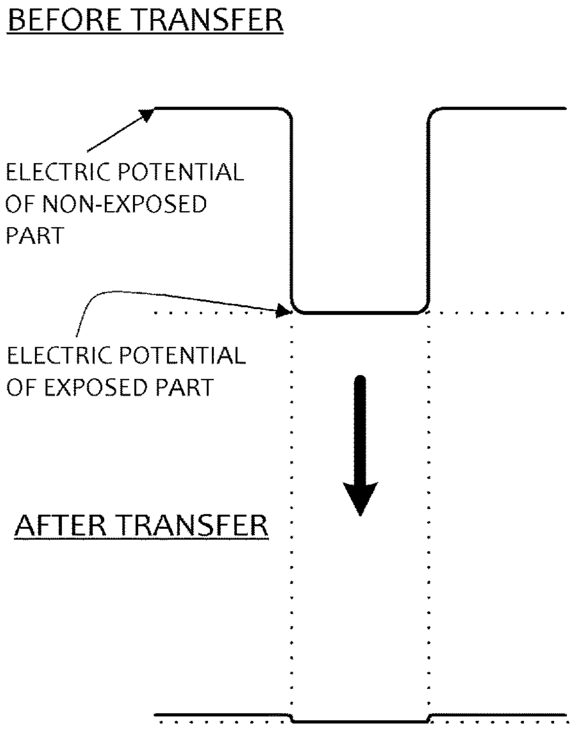
FIGS. 5A and 5B are diagrammatic views showing the electric potential on the photosensitive drum before and after a transfer process in Embodiment 2.
Figure 5B:
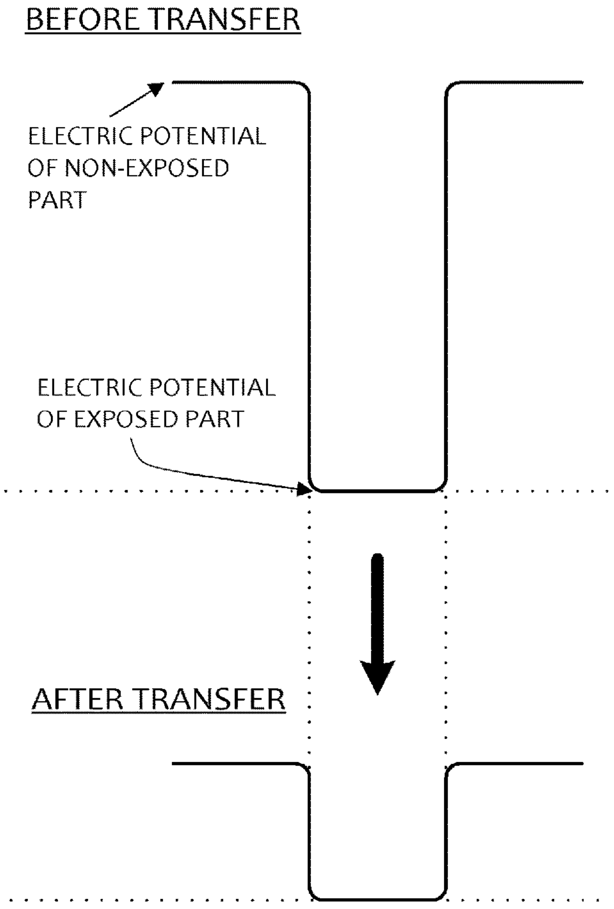

FIG. 5A shows the change in electric potential before and after transfer when the latent image contrast is relatively low. In this case, there is hardly any potential difference between the exposed part and non-exposed parts after the transfer process due to the effect of the transfer voltage. FIG. 5B on the other hand shows the change in electric potential before and after transfer when the latent image contrast is relatively high. In this case, the high electric potential of the non-exposed parts does not fully lower even after the transfer process so that there remains a potential difference between the exposed part and non-exposed parts.

Figure 6A:
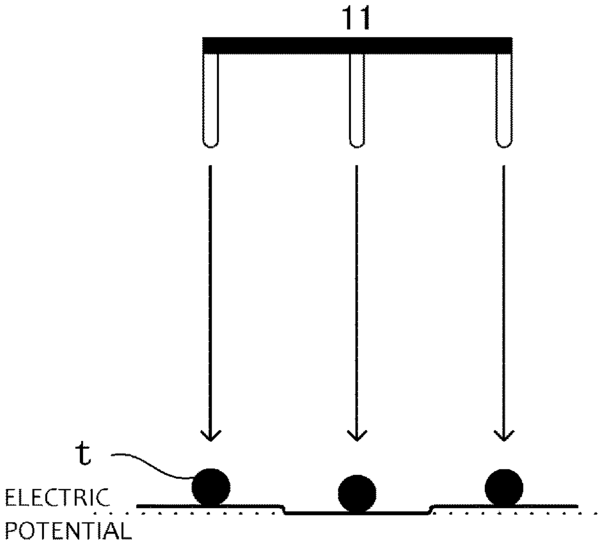
FIGS. 6A and 6B are diagrammatic views showing toner adhesion on the photosensitive drum in Embodiment 2.
Figure 6B:
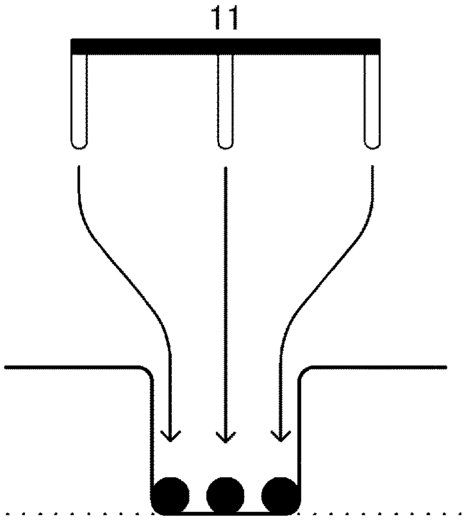

A voltage of −400 V, the same amount as Embodiment 1, is applied to the brush member 11. As has been described in Embodiment 1, even though there is no machine interior contamination, the brush member 11 has some toner thereon, and this toner moves onto the photosensitive drum 1 because of the potential difference between itself and the photosensitive drum 1. FIGS. 6A and 6B illustrate how this happens.

FIG. 6A corresponds to FIG. 5A and shows a case where the latent image contrast is relatively low so that the potential difference between an exposed part and non-exposed parts after the transfer process is small. Toner t in this case adheres uniformly on the photosensitive drum 1. The toner uniformly adhering in this way can readily be charged in the charging process and collected in the developing apparatus 3 so that the issue does not arise. FIG. 6B corresponds to FIG. 5B and shows a case where the latent image contrast is relatively high so that the potential difference between an exposed part and non-exposed parts after the transfer process is large. In this case, the toner gathers in the exposed part because of electric fields concentrated in the exposed part. The toner gathering in this way is charged less in the charging process and therefore collected less in the developing apparatus 3 so that the collection failure occurs.

Figure 7A:
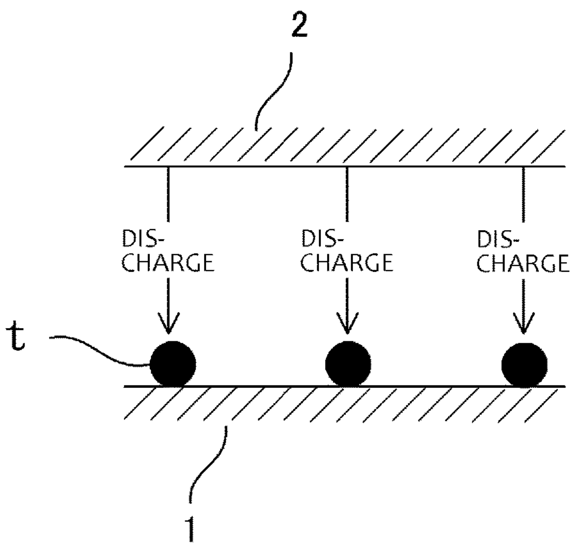
FIGS. 7A and 7B are diagrammatic views showing a discharge occurring on the toner on the photosensitive drum in Embodiment 2.
Figure 7B:
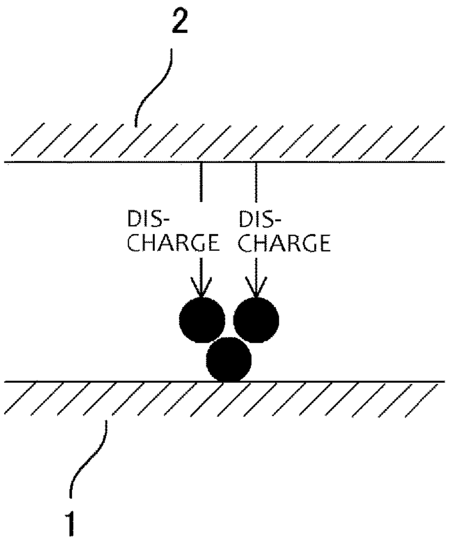

The collection failure will be described in more detail with reference to FIGS. 7A and 7B. FIG. 7A corresponds to FIG. 6A, illustrating a case where toner t is adhering uniformly on the photosensitive drum 1. In this case, the toner can be uniformly given a charge from the charging roller 2, i.e., uniformly charged, so that all the toner can be collected in the developing apparatus 3. FIG. 7B corresponds to FIG. 6B, illustrating a case where there is a spot on the photosensitive drum 1 where toner has gathered in layers. In this case, the toner located closer to the photosensitive drum 1 (layers on the lower side in the paper plane) cannot be given a charge from the charging roller 2. The toner in that part fails to be charged and therefore fails to be collected in the developing apparatus 3 so that the collection failure occurs.

Accordingly, in this embodiment, the brush member 11 is disposed downstream of the pre-exposure apparatus 12 and upstream of the charging roller 2 to neutralize the charge on the photosensitive drum 1 before the brush member 11 comes to contact therewith so as to cancel the potential difference between exposed parts and non-exposed parts after the transfer process. By adopting this configuration, the occurrence of collection failures can be reduced even when a high latent image contrast is to be used, because toner is made to adhere uniformly on the photosensitive drum 1 when the brush member 11 contacts, and therefore can be readily collected in the developing apparatus 3.

In this embodiment, when the pre-exposure apparatus 12 neutralizes the charge, the paper dust is not removed. Therefore, as has been described in Embodiment 1, the amount of discharge in the charging process may be reduced in parts where paper dust has adhered to, because of which the untransferred toner may not be sufficiently charged and may fail to be collected in the developing apparatus 3, i.e., a collection failure may be expected to occur. This is not the case, however, since the charge potential, i.e., the charging voltage is high in this embodiment, so that a sufficiently high amount of discharge can be achieved even in parts where paper dust has adhered to. The untransferred toner is therefore sufficiently charged and can be collected in the developing apparatus 3, and so the occurrence of image defects can be reduced.

As described above, by adopting the configuration of this embodiment, it is possible to prevent toner scattering inside the machine, prevent the occurrence of dotted images caused by paper dust adhering to the photosensitive drum, and prevent collection failures, even when the latent image contrast is high.

The configuration of either Embodiment 1 or Embodiment 2 can be selected as suited based on the level of the latent image contrast to be used.

It goes without saying that by providing the brush member 11 both upstream and downstream of the pre-exposure apparatus 12, all the effects described in Embodiment 1 and Embodiment 2 can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-209232, filed Dec. 17, 2020, which is hereby incorporated by reference wherein in its entirety.

What is claimed is:

1. An image forming apparatus comprising:

a rotatable image bearing member;

a charging unit that contacts the image bearing member to form a charging portion, and that charges a surface of the image bearing member in the charging portion;

an exposure unit that exposes the surface of the image bearing member charged in the charging portion to form an electrostatic latent image;

a developing roller that contacts the surface of the image bearing member to form a developing portion and that supplies a one-component toner charged to have a predetermined polarity to the electrostatic latent image formed on the surface of the image bearing member to form a toner image;

a transfer unit that contacts the image bearing member to form a transfer portion, and that transfers the toner image formed on the surface of the image bearing member onto a recording material in the transfer portion;

a brush that has conductivity and that collects an adhering material adhered to the surface of the image bearing member downstream of the transfer portion and upstream of the charging portion in the rotating direction of the image bearing member and that comprises a brush portion which comprises threads;

a voltage application unit that applies a voltage of the predetermined polarity to the brush; and a controller that controls the voltage application unit, wherein the developing roller collects residual toner on the surface of the image bearing member after the toner image has been transferred onto the transfer material in the transfer portion, wherein the controller controls the voltage application unit such that a potential difference between a voltage of the predetermined polarity applied to the brush and a surface electric potential of the image bearing member on the surface of the image bearing member is not more than a discharge threshold, and wherein the threads have a thread density of 110 to 300 $kF/inch^2$.

2. The image forming apparatus according to claim 1, wherein the controller controls the voltage application unit such that the voltage at a level that can suppress adhesion of the toner on the brush is applied to the brush.

3. The image forming apparatus according to claim 1, wherein the brush rubs on the image bearing member as the image bearing member rotates.

4. The image forming apparatus according to claim 1, wherein the brush portion, which is rubbed on the image bearing member, comprises conductive threads.

5. The image forming apparatus according to claim 1, wherein the threads have an inroad amount of 0.5 to 2 mm onto the image bearing member.

6. The image forming apparatus according to claim 1, wherein the threads have a thread fineness of 2 denier.

7. The image forming apparatus according to claim 1, wherein the brush collects a paper dust fiber adhering to the image bearing member.

8. The image forming apparatus according to claim 1, further comprising a cassette configured to store the recording material.

* * * * *